Oct. 27, 1959 D. RYCRAFT, JR., ET AL 2,909,984
APPARATUS FOR PRODUCING ANIMAL PROTEIN MEALS
Filed Oct. 10, 1955 5 Sheets-Sheet 1

INVENTORS.
DALE RYCRAFT, JR.
RICHARD B. MORTIMER
BY
ATTORNEY.

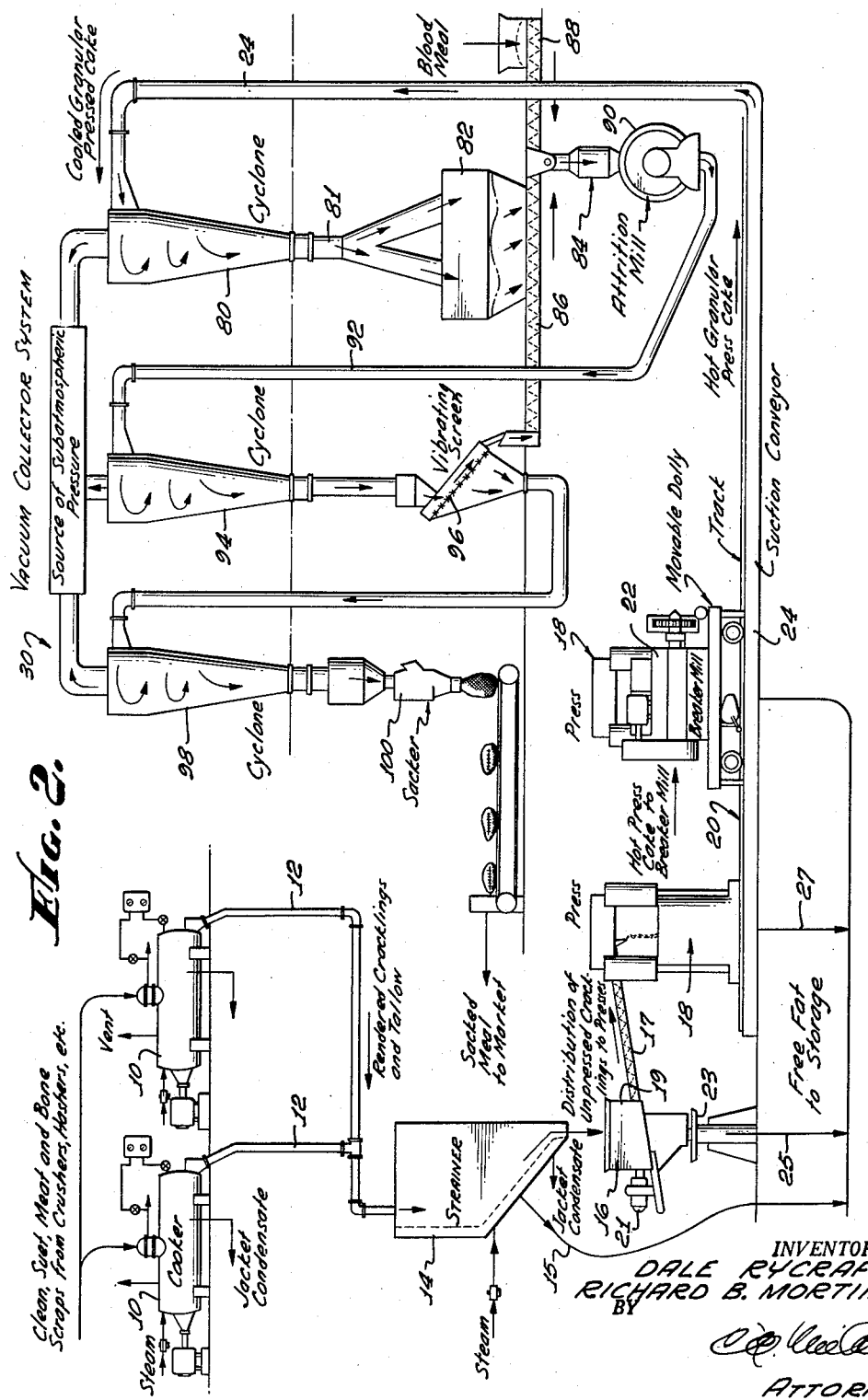

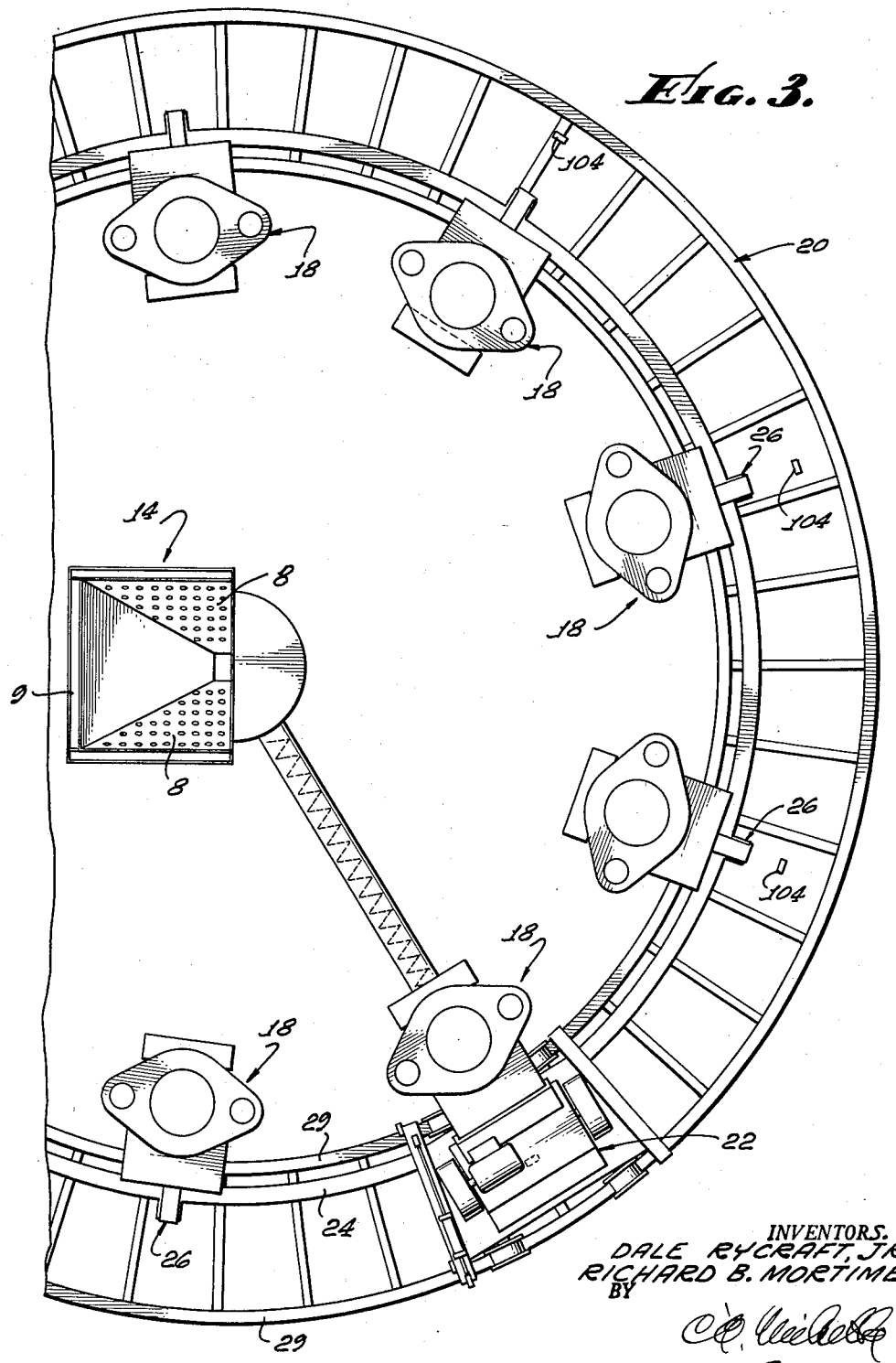

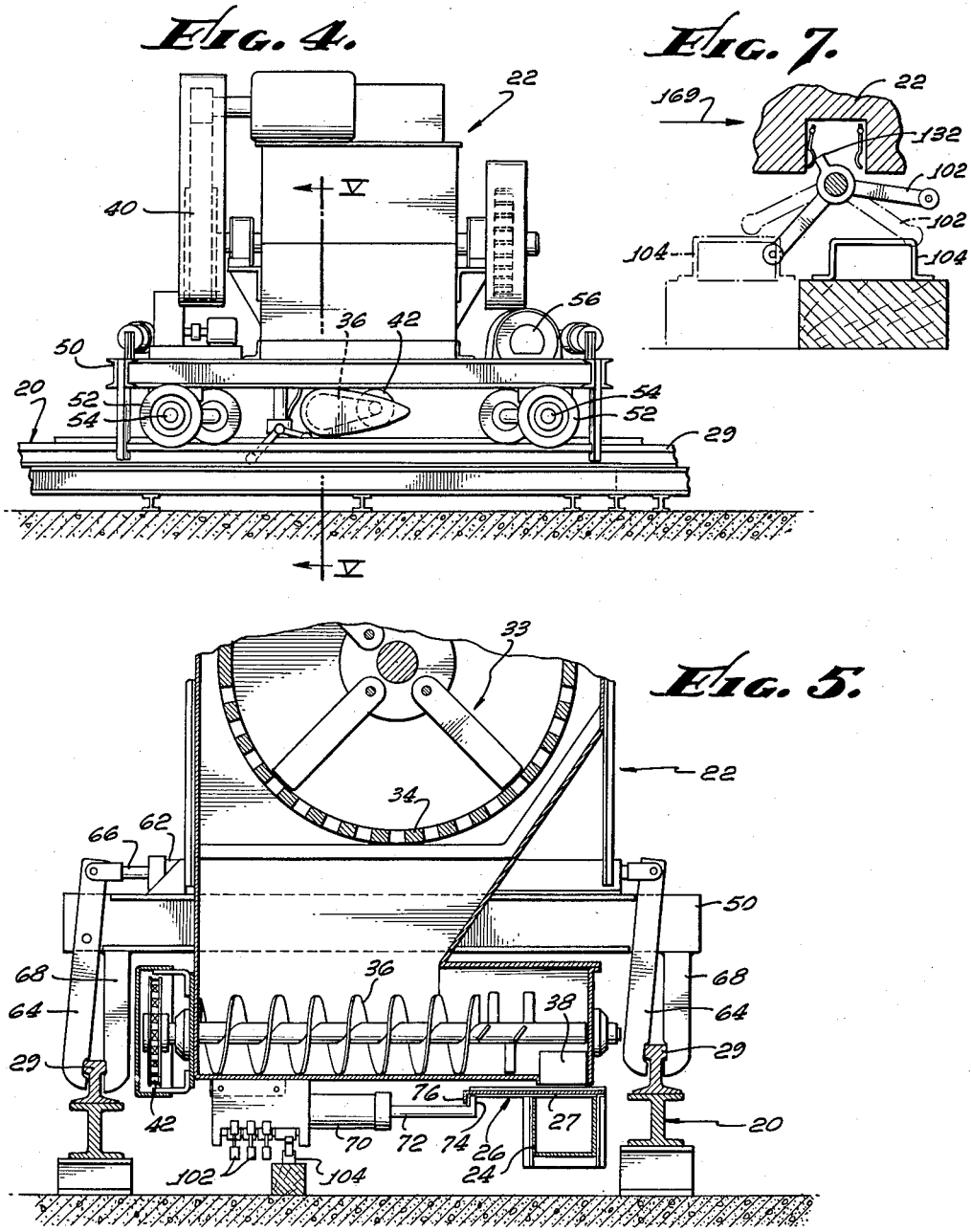

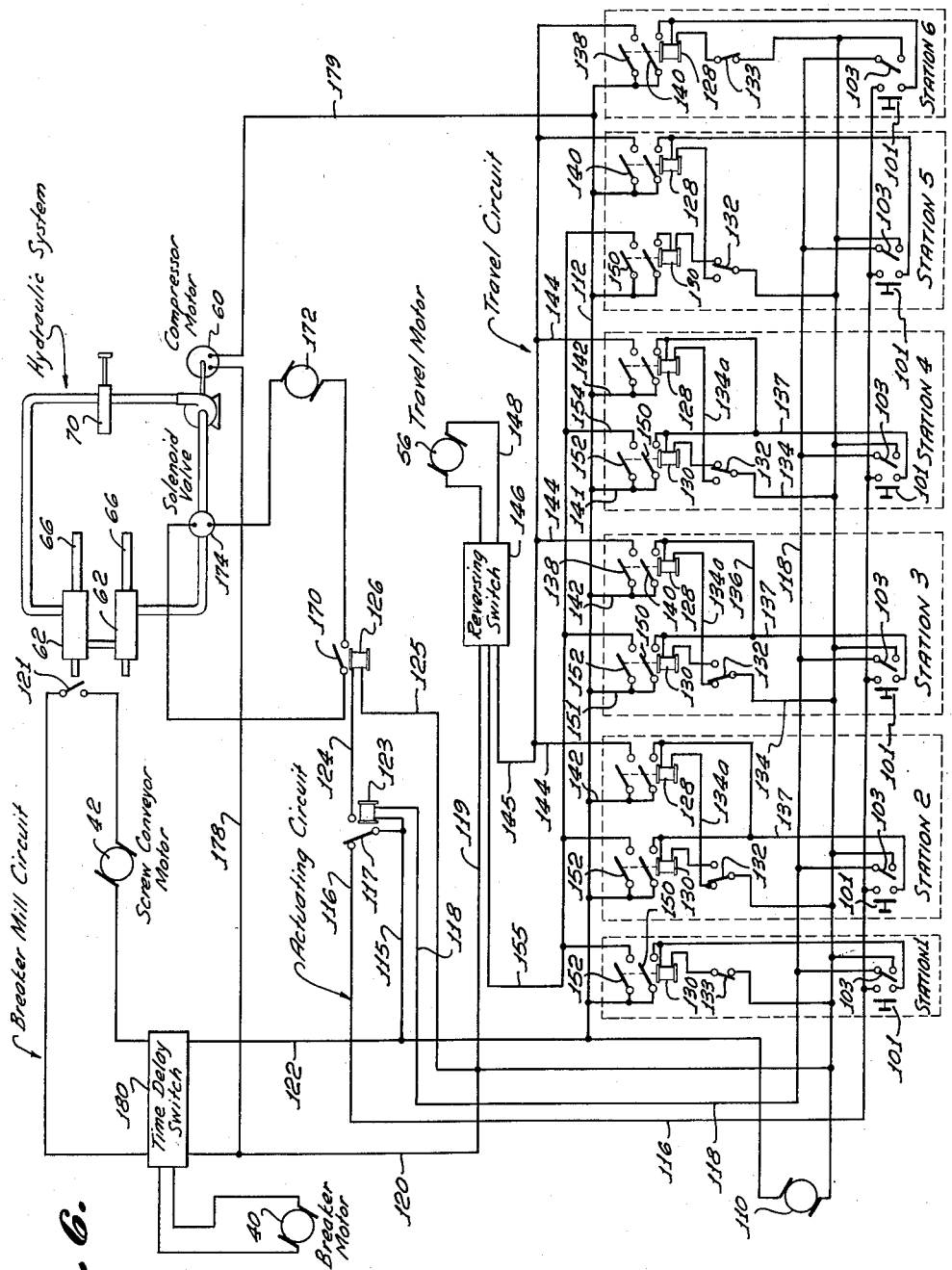

United States Patent Office

2,909,984
Patented Oct. 27, 1959

2,909,984

APPARATUS FOR PRODUCING ANIMAL PROTEIN MEALS

Dale Rycraft, Jr., Compton, and Richard B. Mortimer, Arcadia, Calif., assignors to Peterson Manufacturing Company, Inc., Los Angeles, Calif., a corporation of California Application October 10, 1955, Serial No. 539,616

10 Claims. (Cl. 99—235)

This invention relates to methods and apparatus for the effective, rapid and economical handling of press cakes resulting from the expression or pressing of oil or fat from solid material, whereby said cakes may be rapidly converted into a meal. More specifically, it relates to a virtually continuous system for the effective handling of cracklings (from suet, fat, scraps or trimmings of meat and bone and other such raw materials), in the production of a high protein meal adapted for use as a feed or feed supplement for fowl and animals.

Although the methods and devices may be employed in the treatment and handling of various materials, and typically in the oil meal cake industry, the invention will be described as it particularly relates to the rendering of animal matters in the production of tallow and a protein meal. In the conventional practice of such processes, cracklings are produced by first passing the raw materials through various machines such as "hashers," "crushers" and "hogs" which wash and grind the larger sections of suet, bones and meat scrap to a relatively small size. The ground material is then fed to cookers where it is rendered by dehydration. The effect of the rendering process is to break down the cell walls of animal tissue, releasing tallow and grease in liquid form. The cooked materials are fed, at a temperature of about 200–300° F., to a percolating pan, which is a tank with a perforated screen through which the free fat is drained from the solids. These solids (known as unpressed cracklings) while still hot, are carted to presses where most of the remaining tallow is expressed to produce a compact press cake (known as pressed cracklings). The hot press cake is removed from the presses, stacked and cooled, then transported to a mill where it is broken up and ground. Later it is bagged for shipment and sale.

Processes of this type for producing cracklings have heretofore been inefficient and slow, involving much hand labor and lost motion. Moreover, the techniques employed often result in a finished product of poor quality. For example, excessive cooling of the cracklings prior to pressing should be carefully avoided; otherwise a high residual fat in the press cake is likely to result. Accordingly, the temperature of cracklings to pressing should be at least 180° F.; yet, in present procedures, the strained cracklings from the percolators are often moved to the presses on open belts so that it is extremely difficult to prevent cooling below the desired temperature.

Another difficulty arises because of the belief that press cake cannot be broken up and handled hot but must be cooled prior to feeding to a cake mill or other breaking machine. As a result the press cake (pressed cracklings) is generally taken from the press and loaded by hand onto a suitable cart; the cakes and the cart are then moved into a cooling room and the cakes unloaded in any desired fashion and allowed to cool to ambient temperature. Conventional practice is to leave the cakes in such a room as long as two or three days for cooling. After the cakes have cooled, they are again loaded onto a cart by hand and the cart pushed to a cake mill. There the cakes are fed into the mill by hand and the ground or broken cakes conveyed to a storage bin for subsequent bagging. Due to the delays for cooling and the considerable amount of hand labor involved, the total time required for producing cracklings from unloading of raw materials to bagging of the product from the storage bin is usually about three days.

Difficulties similar to those described hereinabove are also encountered wherever oil seeds, nuts or other oil-bearing materials are processed for the separation of the oil or fat from the solids, such operations involving the production of a residual cake or compressed solids having a low oil or fat content. In some processes expellers are employed instead of hydraulic presses and the solids are in the form of compact masses which, for the purposes of this invention, shall also be referred to as cakes.

Generally stated, the methods of the present invention contemplate a plurality of stationary presses capable of being supplied with material to be pressed, said plurality of presses being arranged to discharge their respective cakes into a single mill and disintegrator. By operating the presses sequentially, a substantially constant flow of cake to a single mill is attained. The cake disintegrated in such mill is then preferably conveyed and simultaneously cooled by a current of air, the ground material being subsequently separated from the air in a suitable separating device. In a preferred form of the invention, means are provided whereby a single cake mill moves from press to press, means being provided whereby the travel of the mill and its operation is automatically regulated and the ground cake therefrom conveyed to suitable receiving means.

Accordingly it is an object of the present invention to provide a virtually continuous system and process for producing a cooled, dried, granular product from pressed fat or oil bearing materials, involving no time lag or delay for cooling of the pressed material prior to milling or disintegration and bagging. Instead the present invention provides for the first time a process by which press cake may be handled hot, and by which overall processing times may be reduced from about three days to considerably less than three hours.

Another object of the invention is to provide a fast efficient process for producing granular meals in which hot press cake is granulated and cooled as it is processed, permitting hand labor to be reduced to a minimum.

Moreover, an object of the present invention is to disclose and provide a novel system of handling press cakes from a battery of presses whereby a disintegrated or comminuted meal may be made rapidly, the presses being maintained in efficient operation and the meal conveyed to storage or blending hoppers directly from a station adjacent each press.

A particular object of the invention is to provide a method and apparatus for rapidly and effectively producing cooled, dried cracklings from suet, ground meat scraps, bones and the like.

Another object of the invention is to provide a control system and method adapted to the accomplishment of the above objects.

Other objects and advantages of the invention will be apparent from the following description and from the drawings in which:

Fig. 2 is a diagrammatic representation, partly in elevation, of the overall method and system of the invention;

Fig. 3 is a top plan view of the system of Fig. 1, with parts in section, showing more completely the relative positioning of various components of the apparatus;

Fig. 4 is a view in elevation of a movable breaker mill, such as might be useful in the system of Figs. 1 to 3;

Fig. 5 is a view in vertical section along the line V—V of Fig. 4;

Fig. 6 is a diagrammatic representation of a control circuit for regulating the operation of the system; and Fig. 7 is an enlarged view in elevation showing details of a limit switch useful in conjunction with the control circuit.

Figure 1:
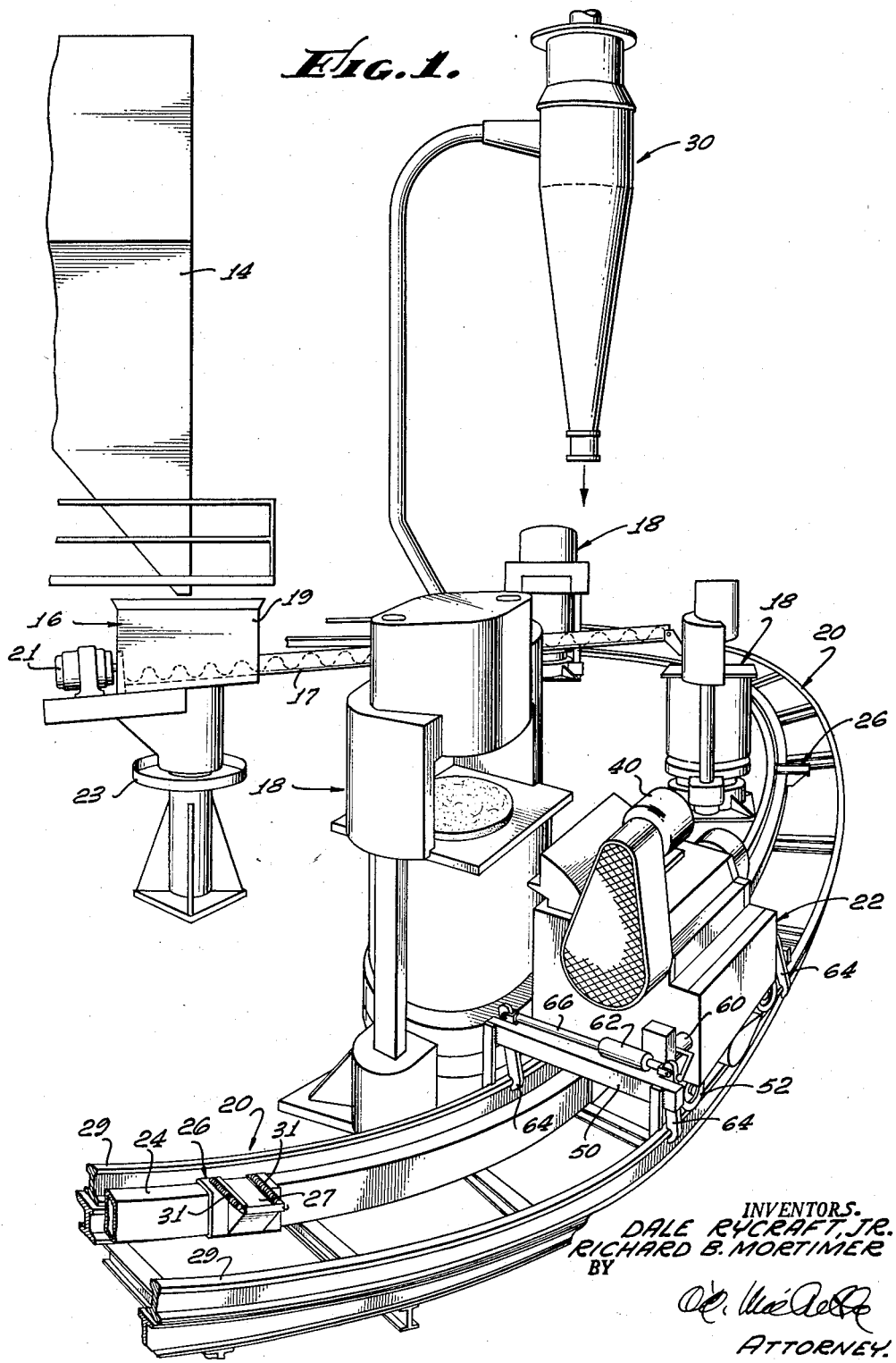
Fig. 1 is a view in perspective of a system for producing cracklings in accordance with the invention, showing a particular adaptation of the system to the continuous porduction, cooling, granulating and conveying of hot press cake.

Although applicable to many materials and operations, the invention will be subsequently described as it particularly relates to the production of a high protein meal from cracklings derived from animal matter. In such processes, raw materials such as suet and scraps of meat and bone are first rendered. The cleanliness, freshness and character of the meat scraps and the care with which such scraps are cooked greatly influences the quality of the rendered products obtained. Desirably, the rendering is accomplished in a plurality of cookers 10 capable of operating in alternation to produce a substantially continuous supply of rendered tallow or fat and unpressed cracklings. After rendering, the fat and cracklings are conducted by conduits 12 to a strainer or settling tank 14 in which the major part of the free fat is drained from the cracklings with very little cooling of the latter.

Positioned immediately below an outlet from the strainer is a distributing means 16 which is arranged in such a way that it may be pivoted or otherwise moved between a plurality of stationary spaced presses 18, permitting a fast, ready conveyance of the strained cracklings to the presses with a minimum of handling and cooling. In the presses, the strained material is pressed to remove remaining portions of the free fat and to produce hot press cake. A trackway 20 is positioned adjacent the presses so as to provide free access of each to a single cake mill 22 supported for movement on the trackway between stations adjacent each of the presses. Also provided is a conveyor 24 proceeding from a position immediately adjacent the trackway to a separating system 30 removed from the presses. In accordance with the invention, the crusher or breaker mill 22 is adapted to receive cakes from a press at each of the stations, while still hot, and discharge disintegrated or granulated cake into a receiving means 26 provided in the conveyor at each of the stations. In its preferred form the conveyor comprises a suction duct extending along the trackway to a vacuum collector system constituting the separating system 30. There the hot granulated material, having been cooled by its passage through the suction duct, is separated from the moving air stream in a series of cyclones for further treatment (such as attrition and screening) prior to storage or bagging and shipment.

Referring more specifically to the illustrative apparatus, the cookers 10 are intended to be representative of conventional types, either vertical or horizontal, capable of supplying a substantially continuous flow of released tallow and cracklings to the strainer 14. As best seen in Figs. 1 to 3, the strainer 14 preferably resembles a hollow inverted pyramid having perforated baffles 8 spaced inwardly from two of its sides, through which the fat drains, and a steam jacket 9 on its third side to prevent appreciable cooling of the fat and cracklings within the strainer. As the rendered material flows down the sloping perforated baffles, a major portion of the free fat (approximately 75%) is removed, and is lead to a suitable storage tank (not shown) as indicated by the flow arrow 15. The remaining unpressed cracklings and some free fat is thereafter discharged by gravity flow into a movable or pivoted distributing means 16 positioned immediately below an outlet from the strainer.

The purpose of the distributing means 16 is to deliver strained cracklings sequentially to a plurality of stationary presses 18 spaced on an arc equidistant from the strainer outlet 14. Preferably, the distributing means comprises a pivoted chute containing a screw conveyor 17, an open-topped inlet tank 19 and a power source 21 for the screw conveyor. The unpressed cracklings are fed through the projecting screw conveyor 17 directly into any one of the presses 18, with any drainage from the conveyor being caught in a pan 23 and lead to storage as indicated generally by the flow arrow 25.

The presses 18 may take any suitable form, but are preferably of the vertical hydraulic type. The function of the press is to extract the remaining tallow from the cracklings by subjecting the cracklings to high pressure. Mechanically the actual pressing takes place within the cylinder of the press which is provided with foraminous or slotted side walls through which the fat can drain to storage (arrow 27 in Fig. 2). Conventionally the cracklings are loaded into the press in layers separated by metal plates or shims. These permit the fat to drain from the center of the press to the outside and also serve to keep the pressure uniform throughout the press. As a practical matter, very good results are obtained when the individual cakes after pressing are about ¾ to 1 inch in thickness although the best thickness is dependent on operating conditions peculiar to an individual press and characteristics of the material employed. If desired, other types of presses than hydraulic may also be employed such as screw presses and the like.

In accordance with the invention, a unique system is provided for handling the press cake in a remarkably short time, and while still hot, to produce a cooled, granular product suitable for immediate storage or bagging. Preferably the system of the invention comprises a vacuum conveyor 24 adjacent to and interconnecting the pressing stations, and adapted to simultaneously convey and cool the granulated material. Provided at a level below the presses is a cooperating trackway 20, and a traveling breaker mill 22 movable along such trackway by which hot press cake may be granulated and fed substantially continuously into the conveyor. For this purpose, duct openings 26 are provided in the vacuum conveyor adjacent each of the presses 18. Covering these openings are hatches or receiving means 27 normally biased into a closed position by springs 31 or other suitable means. As best seen in Fig. 3, the presses 18, the trackway 20 and the intake section of the vacuum conveyor are preferably arranged in substantially circular relation, each equidistant from the centrally located source of cracklings. For example, a particularly advantageous arrangement might include six separate presses arranged in an arc about the strainer 14 and encircled by the trackway. The trackway 20 may comprise separate rails 29 laid in conventional manner, although channels or other convenient means might be employed. Moreover, as will be clear to a worker in the art, many other variations are possible in the system for handling the press cake. For example, the distributor 16 might be movably mounted to facilitate alignment of the presses 18 in a straight row. Likewise other means might be employed for cooling and conveying the ground or broken cake as, for example, blowers or other pneumatic means forcing a stream of air under pressure through the duct 24.

Movable on the trackway between the separate presses is a single cake mill 22 of any desired type. In the form shown, the cake mill is a swing hammer pulverizer or other breaker mechanism 33 which, in conjunction with a grate 34, disintegrates hot cake and causes properly sized particles of hot press cake to be delivered to a conveyor screw 36 extending transversely of the cake mill. Disintegration to particles ⅜ in. and finer in average dimension is adequate although finer comminution can be used.

The screw 36 communicates with a discharge opening 38 positioned above the conveyor 24 and adapted for alignment with the duct openings 26. Preferably separate power sources 40 and 42 are provided for the breaker and conveyor, respectively, for a purpose to be later described. As best seen in Figs. 4 and 5, the breaker mill 22 is movably mounted on a dolly frame 50 supported by wheels 52 and axles 54, the latter aligned in the preferred embodiment with the radial ties of the circular track section. A reversible travel motor 56 supplies rotative power to one of the axles 54 and serves to drive the dolly 50 in either direction along the trackway 20.

Also provided on the dolly is a self-contained hydraulic system supplied with fluid under pressure by a suitable compressor or pump 60. Included in the hydraulic system are two cylinders 62 which actuate pivoted locking arms 64 by means of piston rods 66. Upon actuation of the hydraulic system, the locking arms 64 cooperate with fixed arms 68 to lock the breaker dolly 50 securely in place on the rails 29. Also included is a hydraulic cylinder 70 having a flanged rod 72 so positioned that its flange 74 just passes within cooperating flanges 76 provided on each of the hatches 27 of the conveyor system 24. When the dolly is properly aligned with a hatch adjacent a press, energization of the flanged rod causes the hatch to open against the pressure of the retaining springs 31, thereby permitting granulated material fed by the conveyor screw 38 to fall directly into the vacuum conveyor 24.

A particular advantage of the vacuum collector system is that the hot granulated material is cooled as it is simultaneously conveyed in a stream of relatively cool, low pressure air moving through the duct 24. It will be remembered that the press cake is fed hot into the breaker mill, at a temperature of about 180–200° F., and consequently is still hot when discharged in granular condition through the opening 38 into the duct. The material is then pulled upwardly through the duct 24 to the collector system 30 by any suitable source of subatmospheric pressure, such as a multistage stream ejector or other such means, traveling a considerable distance in the moving stream of low pressure air. The resultant rapid movement of the material suspended in the air stream causes very rapid cooling so that the material entering the first cyclone 80 of the vacuum collector system has cooled to a temperature of about 80 to 100° F.

In the cyclone the substantially cooled granular material is separated from the air stream by centrifugal force and caused to settle into a storage bin 82 positioned below the outlet 81 of the cyclone. From the storage bin the cooled granular material may be fed by a mixing and distributing mechanism 84 including screw conveyor 86 to a suitable attrition mill 90. If desired, an additional screw conveyor 88 may be employed to incorporate other crackling ingredients into the granulated press cake prior to charging the whole to the attrition mill. For example, a product useful as a high protein chicken feed may advantageously contain added amounts of blood meal.

In the attrition mill 90 the mixed ingredients are ground or pulverized to a desired particle size and the ground material passed through a vacuum line 92 to a second cyclone 94 where the mixed material is again separated from the air stream and allowed to settle on a suitable screening mechanism, such as the vibrating screen 96. The size of the screen will of course determine the particle size of the final product, which generally will pass an 8 to 12-mesh sieve. As shown in Fig. 2, the rejects from the screen are returned by way of an extension of the screw conveyor 86 to the attrition mill for further grinding and mixing. The screenings are pulled by the vacuum system 30 into a third cyclone 98 and from there pass to a sacker 100 or other packaging device for subsequent storage or shipment.

It is an important feature of the invention that the movement and operation of the cake mill between the separate spaced presses can be controlled entirely from the individual stations adjacent the presses. Desirably a control system for this purpose will permit an operator at the press to move the cake mill into a receiving position adjacent his station at the end of a pressing operation so that the press cake can be discharged into the cake mill, granulated and then introduced into the vacuum conveying and cooling system.

A suitable control system for this purpose is indicated diagrammatically in Fig. 6. Essentially this control system comprises two main circuits, a travel circuit regulating movement of the cake mill and a mill circuit governing the operation of the breaker mill, and auxiliary circuits including an actuating circuit permitting energization of the first two circuits in alternation.

To operate the control system, there is preferably provided at each station a push button 101 controlling the operation of the travel circuit and a switch 103 controlling the operation of the mill circuit. Thus when an operator desires to move the dolly 50 to a position adjacent his station, he pushes the button 101 energizing the travel circuit, causing the dolly to move along the track until it reaches a position adjacent the press. At this point a suitable limit switch is tripped, breaking the travel circuit and causing the dolly to stop in a properly aligned position adjacent the press. In the illustrated apparatus, separate trip mechanisms 104 are provided in a radially staggered relation adjacent each of the stations (Fig. 3) so that correspondingly staggered limit switches 132 carried by the dolly will each be capable of coacting in turn with a particular trip mechanism.

After the travel circuit has been interrupted, causing the dolly to stop, the mill-operating circuit may be energized through the actuating circuit by closing the switch 103 at the same station. The effect of closing switch 103 is first to break the travel circuit to all other stations so that movement of the dolly carrying the breaker mill is prevented until the cycle of operations at the particular station is completed. Next, the hydraulic system operates to open the receiving hatch 27 adjacent the station and to pivot the locking arms 64 to rigidly position the breaker mill in the desired position adjacent the press 18. Movement of a locking arm 64, in turn, mechanically energizes the main mill-operating circuit, starting the screw conveyor below the breaker and after a momentary delay the motor for the breaker.

Referring in detail to the illustrative system of Fig. 6, 440-volt A.C. current is supplied from any suitable source 110 directly to the travel circuit by mains 112 and 114, while the main power input to the breaker mill circuit is by mains 120 and 122. Interlocking the two main circuits for energization in alternating sequence is an actuating circut effected by branch lines 115, 116, 118 and a single pole double throw microswitch 117. As will appear, switch 117 is normally positioned so that actuation of a push button 101 will close the travel circuit, causing the dolly 50 to move. On the other hand, closing of a control switch 103 acts to reverse the normal position of switch 117 and thereby energize the mill operating circuit.

The operation of the travel circuit will now be described. If, for example, the push button 101 at station 3 is depressed, power is supplied to one of the relays 128 or 130 depending on the position of the limit switch 132 adjacent the station. In the illustration the left-hand pole of the limit switch is closed, causing energization of the relay 128 through branch lines 134 and 134a which connect into the main 114. The other source of power into the relay 128 is through branch lines 136 and 137 to button 101 and through line 116, switch 117 and line 115 to the main 122. The effect of energization of the relay 128 is to close ganged microswitches 138 and 140, with the closing of switch 140 causing a holding circuit for the relay to be created through branch line 142 to the main 112 so that the relay will continue to be energized although the pressure on the push button is released. The effect of closing switch 138 is to transmit power to the travel motor through lines 142, 144 and 145, reversing switch 146 and lines 148 and 119 returning to the main 122.

It will be apparent that had the right-hand pole of limit switch 132 been closed, relay 130 would have been energized instead of relay 128. In this event, a holding circuit would again have been energized through switch 150 whereas the travel motor would have been caused to operate in a reverse direction by the power input through line 151, switch 152 and lines 154 and 155 to the other side of the reversing switch 146. As respects the intermediate stations 2 to 5, it will be evident therefore that the direction of travel of the dolly will depend upon the particular position of the limit switches 132 adjacent the stations. The positions of the limit switches in turn depends upon the extent and direction of previous movement of the dolly 50 past the stations, as will appear. In Fig. 6 the positions of the switches are illustrated as if the dolly had moved from station 1 through stations 2 and 3 and is approaching station 4. At the end stations 1 and 6, single throw limit switches 133 may be employed, in a normally closed position, since the cake mill is only capable of approaching these stations from one direction.

Fig. 7 exemplifies one suitable trip mechanism by which the limit switches 132 may be properly positioned regardless of the direction of movement of the dolly 50 into one of the intermediate stations (2 to 5). As illustrated, each device comprises a double arm pivot 102 adapted to coact with a stationary trip member 104 at one of the stations. For example, movement of the dolly 50 in the direction of arrow 169 will cause the member 102 to be pivoted from the full line position to the dotted line position, causing limit switch 132 to be spring biased from a left-hand to a right-hand position as relates to the wiring diagram of Fig. 6. In effect, as a limit switch is caused to break contact on movement into a station from one direction, it simultaneously is caused to make contact with the opposite pole to act as a limit switch on subsequent movement of the dolly into the station from the opposite direction.

In contrast, the limit switches 133 provided at the end stations 1 and 6 may be caused to open by direct contact with the cake mill dolly 50, terminating operation of the travel motor. On energization of the travel motor by a signal from another station, however, the dolly will move away from the switch, allowing it to close to await return of the moving cake mill at a later time.

It will be apparent that the travel circuit just described permits an operator at a particular station to move the cake mill 22 to a position adjacent his station by merely depressing the push button 101. No particular sequence of movement of the cake mill between the stations is required since actuation of push button 101 at any of the stations will cause the cake mill and its supporting dolly to be moved along the trackway to a position adjacent that station.

Once the cake mill has moved to a position adjacent a particular press 18, operation of the mill is initiated by closing the switch 103 at that station. The effects of closing a switch 103 are threefold, the first being to energize relay 123 through line 118 and thereby to throw switch 117 from its normal position. This immediately breaks the travel circuit to all stations, preventing any further movement of the cake mill. Next, movement of switch 117 to its right-hand position causes energization of relay 126 through lines 124 and 125. This causes switch 170 to close, energizing the 440-volt A.C. circuit through a source 172 and causing the normally closed solenoid valve 74 to open. It will be noted that the hydraulic system is maintained under constant pressure by a compressor motor 60 supplied with a direct power input by lines 178 and 179 to the mains 120 and 112, respectively. The third effect of closing switch 103, caused by opening the solenoid valve 174, is to actuate the hydraulic cylinders 62 and 70, causing the locking arms 64 to engage the rails 29 and the duct hatch 27 adjacent the press to open. In addition, movement of the one of the locking arm rods 66 mechanically closes switch 121, thereby closing the main breaker mill circuit through mains 120 and 122.

The breaker mill circuit immediately supplies energy to the screw conveyor motor 42 located below the breaker mill, and shortly thereafter to the breaker motor 40. The purpose of the time delay in energization of the breaker motor 40 (which may be caused by a conventional time delay switch 180) is to permit a full braking of the dolly 50 by the locking arms 64 prior to starting the breaker motor. The effect is a rigid positioning of the dolly frame which prevents shaking of the mill dolly 50 during operation of the breaker mill. In addition, the slight delay in the operation of the breaker motor also provides the conveyor screw 36 a short period in which to clear itself before a new supply of granulated press cake descends from the mill for delivery to the conveyor duct 24.

After all the press cake at a press 18 has been fed into the mill 22 and delivered from the mill to the vacuum conveyor duct, the operator must open the switch 103 at his station to permit reenergization of the travel circuit; that is, upon opening the switch 103 at his station the operator breaks the auxiliary circuit supplying relay 123, permitting switch 117 to return to its normal position in the travel circuit. Opening of switch 117 in turn breaks the circuit energizing the hydraulic system, closing solenoid valve 174 and thereby permitting the duct hatch 26 adjacent the station to close and the locking arms 64 to disengage so that the cake dolly 50 is again ready for movement to another station.

It will be noted that return movement of the hydraulically operated rods 66 causes the mill circuit to open, thereby de-energizing the screw conveyor motor 42 and breaker motor 40. However, it is a feature of the invention that the time delay switch 180 prevents the breaker motor 40 from stopping immediately, permitting a substantial period of operation after the switch 121 has opened. Preferably a period of about one to four minutes delay is provided before the breaker motor ceases to operate, such delay permitting continued high speed operation of the breaker motor until the breaker mill can be moved from one station to another under ordinary operating conditions. As a result, power losses due to starting and stopping of the breaker motor between stations may be successfully avoided.

From the above description it should be apparent that the present invention makes possible a substantially continuous process for producing meals and other granular products. Moreover, the process may be carried out without the usual interruptions and delays for cooling or manual handling of the press cake so prevalent in the prior art. As a result, the method and system of the present invention permits a considerable reduction in labor and time expended. By way of example, what once required eight to ten men at least two to three days to accomplish may now be achieved by two to four men in no more than one to three hours. In addition, the present invention makes possible these unique results without any sacrifice of floor space or product quality; in fact, product quality is greatly improved by the rapid processing.

To those skilled in the art to which this invention relates, many changes in construction and widely differing embodiments and applications of the invention will suggest themselves without departing from the spirit and scope of the invention. For example, instead of the pivoted distributor mechanism disclosed, one or more conveyor belts or other movable means might be employed. Likewise separate means might be used to cool and convey the ground press cake as, for example, cooling towers fed by bucket conveyors or other such devices. Accordingly, it should be understood that the disclosure and the description herein are purely illustrative and are not intended to be in any sense limiting.

We claim:

1. In a system for handling press cakes, a plurality of stationary spaced presses, each adapted to discharge coherent cakes; a single, substantially horizontal conveyor means extending adjacent said plurality of presses, said conveyor means being adapted to convey granulated press cake, said conveyor means being provided with means for receiving granulated press cake from stations adjacent said presses; a single cake mill mounted for movement between stations adjacent said presses; a trackway adjacent the presses adapted to guidingly support said mill for movement between stations; said mill being adapted to receive cake from a press at a station and discharge granulated cake into receiving means provided in said conveyor at such station means for driving said mill; means for moving said mill and its driving means; and means for stopping the mill at a desired station.

2. A system of the character stated in claim 1 wherein the conveyor means comprises a suction duct leading to a separator, and each of the means for receiving granulated press cake comprises a port with a movable closure therefor.

3. In a system for handling press cakes, a plurality of stationary spaced presses, each adapted to discharge coherent cakes; a single, substantially horizontal conveyor means extending adjacent and below said plurality of presses, said conveyor means being adapted to convey granulated press cake, said conveyor means being provided with means for receiving granulated press cake from stations adjacent said presses; a single cake mill mounted for movement between stations adjacent said presses, said mill being adapted to receive cake by gravity from a press at a station and discharge granulated cake by gravity into receiving means provided in said conveyor at such station; a trackway adjacent the presses adapted to guidingly support said mill for movement between stations; means for driving said mill; means for moving said mill and its driving means; means for stopping the mill at a desired station; and means for rendering said conveyor receiving means operative at a station occupied by said mill upon energization of the mill driving means.

4. In a system for producing protein meals continuously from animal matter: a plurality of cookers capable of operating in alternation to produce a substantially continuous supply of rendered fat and cracklings; conduit means conducting said supply of rendered material to a strainer; distributing means pivoted adjacent an outlet from said strainer for delivering strained cracklings in alternation to a plurality of stationary, spaced presses; a trackway adjacent the presses; stationary conveyor means extending adjacent said trackway; a single cake mill supported for movement on said trackway between stations adjacent said presses, said mill being adapted to receive cake from a press at a station and discharge granulated cake into receiving means provided in said stationary conveyor at such station; and means cooperating with said conveyor for cooling the granulated material as it is conveyed; whereby a cooled, dried, granular, proteinacious meal may be delivered substantially continuously from said conveyor.

5. The system of claim 4 in which the conveyor means comprises a duct in communication with a source of sub-atmospheric pressure including a separator, and said cooling means comprises air at room temperature entering said duct.

6. In a system for producing protein meals continuously from animal matter: a plurality of cookers capable of operating in alternation to produce a substantially continuous supply of rendered fat and cracklings; conduit means conducting said supply of rendered material to a strainer; distributing means pivoted adjacent an outlet from said strainer for delivering strained cracklings in alternation to a plurality of stationary spaced presses; a trackway adjacent the presses; stationary conveyor means including a duct in fluid communication with a source of sub-atmospheric pressure extending adjacent said trackway; a single cake mill supported for movement on said trackway between stations adjacent said presses; a port with a movable closure provided in said duct adjacent each of said stations; said mill being adapted to receive cake from a press at a station and discharge granulated cake into the port provided in said stationary conveyor at such station; means carried by the mill for engaging and moving the closure for said port to an open position when the mill has stopped at such station; and a separator for removing resulting dried cooled meal from low pressure air flowing in said duct.

7. The system of claim 4 including means driving the mill; means moving the mill and its driving means on said trackway; means including a control for stopping the mill at a desired station; and means likewise including a control for rendering a port-engaging and moving means operative only at the station occupied by said mill.

8. The device of claim 7 in which said means for stopping a mill at a desired station includes grip members operably engaging the trackway when the mill is properly aligned with a port in said conveyor means.

9. In a system for handling press cakes, a plurality of stationary spaced presses, each adapted to discharge coherent cakes; a single, substantially horizontal conveyor means extending adjacent said plurality of presses, said conveyor means being adapted to convey granulated press cake, said conveyor means being adapted to receive granulated press cake from stations adjacent said presses; suction means associated with said conveyor means to generate a stream of cool air therethrough at a pressure less than atmospheric and a single cake mill mounted for movement between stations adjacent said presses, said mill being adapted to receive cake from a press at a station and discharge granulated cake to said conveyor at such station.

10. A system of the character stated in claim 9 wherein the conveyor means comprises a suction duct leading to a separator, said duct including port means selectively operable by said cake mill for receiving granulated press cake from stations adjacent said presses.

References Cited in the file of this patent

UNITED STATES PATENTS

| 1,317,675 | Allbright | Oct. 7, 1919 |
| 1,354,068 | Taylor | Sept. 28, 1920 |
| 1,489,940 | Hiller | Apr. 8, 1924 |
| 2,705,597 | Erickson | Apr. 5, 1955 |

FOREIGN PATENTS

| 312,057 | Great Britain | 1930 |
| 318,168 | Italy | 1934 |